(12) United States Patent
Aahlad et al.

(10) Patent No.: US 8,364,633 B2
(45) Date of Patent: Jan. 29, 2013

(54) DISTRIBUTED COMPUTING SYSTEMS AND SYSTEM COMPONENTS THEREOF

(75) Inventors: Yeturu Aahlad, Foster City, CA (US); Rahul Bhargava, San Ramon, CA (US); James Milton Campigli, San Ramon, CA (US); David James Richards, San Ramon, CA (US); Mohammad Naeem Akhtar, Dublin, CA (US)

(73) Assignee: Wandisco, Inc., San Ramon, CA (US)

( * ) Notice: Subject to any disclaimer, the term of this patent is extended or adjusted under 35 U.S.C. 154(b) by 912 days.

(21) Appl. No.: 11/329,996

(22) Filed: Jan. 11, 2006

(65) Prior Publication Data
US 2006/0155729 A1    Jul. 13, 2006

Related U.S. Application Data

(60) Provisional application No. 60/643,257, filed on Jan. 12, 2005, provisional application No. 60/643,258, filed on Jan. 12, 2005, provisional application No. 60/643,269, filed on Jan. 12, 2005.

(51) Int. Cl.
*G06F 7/00* (2006.01)
*G06F 17/00* (2006.01)

(52) U.S. Cl. ........ 707/610; 707/611; 707/612; 707/622; 709/248

(58) Field of Classification Search ............... None
See application file for complete search history.

(56) References Cited

U.S. PATENT DOCUMENTS

| | | | | |
|---|---|---|---|---|
| 5,261,085 A | * | 11/1993 | Lamport | 714/4 |
| 5,699,515 A | * | 12/1997 | Berkema et al. | 370/448 |
| 5,737,601 A | * | 4/1998 | Jain et al. | 707/201 |
| 5,781,910 A | * | 7/1998 | Gostanian et al. | 707/610 |
| 6,014,669 A | * | 1/2000 | Slaughter et al. | 707/610 |
| 6,161,146 A | * | 12/2000 | Kley et al. | 709/248 |
| 6,202,067 B1 | * | 3/2001 | Blood et al. | 707/10 |
| 6,261,085 B1 | | 7/2001 | Steger et al. | |
| 6,360,366 B1 | * | 3/2002 | Heath et al. | 717/178 |
| 6,401,120 B1 | * | 6/2002 | Gamache et al. | 709/226 |
| 6,898,642 B2 | * | 5/2005 | Chafle et al. | 709/248 |
| 7,155,524 B1 | * | 12/2006 | Reiter et al. | 709/229 |
| 7,167,900 B2 | * | 1/2007 | Berkowitz et al. | 709/205 |
| 7,558,883 B1 | * | 7/2009 | Lamport | 709/248 |
| 2002/0129087 A1 | * | 9/2002 | Cachin et al. | 709/200 |
| 2003/0145020 A1 | * | 7/2003 | Ngo et al. | 707/201 |
| 2005/0086384 A1 | * | 4/2005 | Ernst | 709/248 |
| 2005/0198493 A1 | * | 9/2005 | Bartas | 713/154 |
| 2006/0259818 A1 | | 11/2006 | Howell et al. | |
| 2010/0192160 A1 | | 7/2010 | Taylor et al. | |

OTHER PUBLICATIONS

IEEE 100 The Authoritative Dictionary of IEEE Standards Terms, Dec. 2000, IEEE, Seventh Edition, p. 725.*
Oki et al. "Viewstamped Replication: A New Primary Copy Method to Support Highly-Available Distributed Systesm", Technical Paper submitted at ACM Symposium . . . , 1988, pp. 8-17.
Schenider, "Implementing fault-tolerant services using the state machine apporach: A tutorial", Technical Paper submitted ACM Comp. Surveys 22, Dec. 1990, pp. 299-319.

(Continued)

*Primary Examiner* — Krista Zele
*Assistant Examiner* — Matthew Lindsey
(74) *Attorney, Agent, or Firm* — Young Law Firm, P.C.

(57) ABSTRACT

In one embodiment of the present invention, a replicated state machine comprises a proposal manager, an agreement manager, a collision/back-off timer and a storage reclaimer. The proposal manager facilitates management of proposals issued by a node of a distributed application for enabling coordinated execution of the proposals by all other nodes of the distributed application. The agreement manager facilitates agreement on the proposals. The collision/back-off timer precludes repeated pre-emptions of rounds in attempting to achieve agreement on the proposals. The storage reclaimer reclaims persistent storage utilized for storing at least one of proposal agreements and the proposals.

41 Claims, 6 Drawing Sheets

OTHER PUBLICATIONS

Bernstein et al., "Concurrency Control & Recovery in Database Systems", published by Addison Wesley, 1987, Chapters 6, 7 & 8.
Final Rejection of Nov. 30, 2011 in related U.S. Appl. No. 12/069,986.
Non-Final Rejection of Apr. 26, 2011 in related U.S. Appl. No. 12/069,986.
Non-Final Rejection of Jun. 23, 2010 in related U.S. Appl. No. 12/069,986.

\* cited by examiner

FIG. 5

| Local Sequence 400 | | | | |
|---|---|---|---|---|
| Proposer ID=0x123 | LSN | GSN | Agreement Number | Content |
| Proposer ID=0x123 | LSN | GSN | Agreement Number | Content |
| Proposer ID=0x123 | LSN | GSN | Agreement Number | Content |

FIG. 6

| Global Sequence 500 | |
|---|---|
| GSN #1 | Local Sequence Handle 400 |
| GSN #2 | Local Sequence Handle 400 |
| GSN #3 | Local Sequence Handle 400 |
| GSN #4 | Local Sequence Handle 400 |

DISTRIBUTED COMPUTING SYSTEMS AND SYSTEM COMPONENTS THEREOF

CROSS REFERENCE TO RELATED APPLICATIONS

This patent application claims priority to co-pending U.S. Provisional Patent Application having Ser. No. 60/643,257 filed Jan. 12, 2005 entitled "Active, Transparent, Highly Available, Scalable Replicator of Information Repositories", having a common applicant herewith and being incorporated herein in its entirety by reference.

This patent application claims priority to co-pending U.S. Provisional Patent Application having Ser. No. 60/643,258 filed Jan. 12, 2005 entitled "Reliable, Available and Scalable Replicated State Machine", having a common applicant herewith and being incorporated herein in its entirety by reference.

This patent application claims priority to co-pending U.S. Provisional Patent Application having Ser. No. 60/643,269 filed Jan. 12, 2005 entitled "Method and Apparatus for Transparent and Active Replication of A CVS Repository", having a common applicant herewith and being incorporated herein in its entirety by reference.

FIELD OF THE DISCLOSURE

The disclosures made herein relate generally to distributed computing systems and system components thereof and, more particularly, to enhancing scalability, availability, reliability and transparency of replicated state machines and replicated information repositories.

BACKGROUND

Collaborative projects, which are often facilitated in a concurrent manner between globally separated resources (i.e., multi-site collaborative projects), have become commonplace for any number of different types of projects. Examples of such projects include, but are not limited to, developing software, designing jetliners and designing automobiles. Relying upon distributed resources (e.g., resources at physically different locations, logically different locations, etc) to accelerate project time lines through optimisation of human resource utilization and leveraging of global resource skill sets has proven itself to offer advantageous results. The use of distributed computing solutions has been a key enabler of such collaborative projects in that it provides a relatively effective and efficient means of sharing information between physically separated locations, logically separated locations, etc.

A distributed computing solution used in facilitating a multi-site collaborative project is referred to herein as a distributed multi-site collaborative computing solution. However, a distributed multi-site collaborative computing solution is only one example of a distributed computing solution. In one example, a distributed computing solution comprises a network of computers operating an automobile. In another example, a distributed computing solution comprises a network of computers in one geographic location (a data center). In still another example, a distributed computing solution is a plurality of computers connected to one router (i.e., a subnet).

While conventional distributed computing solutions do exist, they are not without limitations that adversely impact their effectiveness, reliability, availability, scalability, transparency and/or security. In particular, with respect to conventional distributed multi-site collaborative computing solutions are limited in their ability to synchronize work from globally distributed development sites in a real-time, fault-tolerant manner. This inability forces changes in software development and delivery procedures that often cause delays and increase risk. Accordingly, cost savings and productivity improvements that should be realized from implementing a collaborative project utilizing a conventional distributed computing solution are not fully achieved.

Conventional distributed multi-site collaborative computing solutions undesirably force users to change their development procedures. For example, conventional distributed multi-site collaborative computing solutions that lack advantageous functionalities associated with real-time information management capabilities have a fundamental problem in that they cannot guarantee that local and remote Concurrent Versions Systems (CVS) repositories will be in sync at any point in time. This means that there is a great likelihood that developers at different sites can inadvertently overwrite or corrupt each other's work. To prevent such potential for overwriting and corruption, these conventional distributed multi-site collaborative computing solutions require excessive and/or error prone source code branching and manual file merging to become part of the development process. This effectively forces development work to be partitioned based on time zones and makes collaboration between distributed development teams extremely challenging, if not impossible.

A replicated state machine is a preferred enabler of distributed computing solutions. One of several possible examples of a distributed computing solution is a replicated information repository. Therefore, more particularly, a replicated state machine is a preferred enabler of replicated information repositories. One of several possible applications of replicated information repositories is distributed multi-site collaborative computing solutions. Therefore, more particularly, a replicated state machine is a preferred enabler of distributed multi-site collaborative computing solutions.

Accordingly, distributed computing solutions often rely upon replicated state machines, replicated information repositories or both. Replicated state machines and/or replicated information repositories provide for concurrent generation, manipulation and management of information and, thus, are important aspects of most distributed computing solutions. However, known approaches for facilitating replication of state machines and facilitating replication of information repositories are not without their shortcomings.

Conventional implementations of facilitating replication of state machines have one or more shortcomings that limit their effectiveness. One such shortcoming is being prone to repeated pre-emption of proposers in an agreement protocol, which adversely impacts scalability. Another such shortcoming is that the implementation of weak leader optimization requires the election of a leader, which contributes to such optimisation adversely impacting complexity, speed and scalability, and requires one more message per agreement (e.g., 4 instead of 3), which adversely impacts speed and scalability. Another such shortcoming is that agreements have to be reached sequentially, which adversely impacts speed and scalability. Another such shortcoming is that reclamation of persistent storage is limited, if not absent altogether, which imposes a considerable burden on deployment because storage needs of such a deployment will grow continuously and, potentially, without bound. Another such shortcoming is that efficient handling of large proposals and of large numbers of small proposals is limited, if not absent altogether, which adversely affects scalability. Another such shortcoming is that a relatively high number of messages must be communicated for facilitating state machine replication, which adversely affects scalability and wide area network compatibility. Another limitation is that delays in communicating messages adversely impact scalability. Another such shortcoming is that addressing failure scenarios by dynamically changing (e.g., including and excluding as necessary) participants in the replicated state machine adversely impacts complexity and scalability.

Conventional implementations of facilitating replication of information repositories have one or more shortcomings that limit their effectiveness. One such shortcoming is that certain conventional multi-site collaborative computing solutions require a single central coordinator for facilitating replication of centrally coordinated information repositories. Undesirably, the central coordinator adversely affects scalability because all updates to the information repository must be routed through the single central coordinator. Furthermore, such an implementation is not highly available because failure of the single central coordinator will cause the implementation to cease to be able to update any replica of the information repository. Another such shortcoming is that, in an information repository replication implementation relying upon log replays, information repository replication is facilitated in an active-passive manner. Therefore, only one of the replicas can be updated at any given time. Because of this, resource utilization is poor because other replicas are either idle or limited to serving a read-only application such as, for example, a data-mining application. Another such shortcoming results when implementation relies upon weakly consistent replication backed by conflict-resolution heuristics and/or application-intervention mechanisms. This type of information repository replication allows conflicting updates to the replicas of the information repository and requires an application using the information repository to resolve these conflicts. Thus, such an implementation adversely affects transparency with respect to the application.

Still referring to conventional implementations of facilitating replication of information repositories have one or more shortcomings that limit their effectiveness, implementations relying upon a disk mirroring solution are known to have one or more shortcomings. This type of implementation is an active-passive implementation. Therefore, one such shortcoming is that only one of the replicas can be used by the application at any given time. Because of this, resource utilization is poor because the other replicas (i.e., the passive mirrors) are neither readable nor writable while in their role as passive mirrors. Another such shortcoming of this particular implementation is that the replication method is not aware of the application's transaction boundaries. Because of this, at the point of a failure, the mirror may have a partial outcome of a transaction, and may therefore be unusable. Another such shortcoming is that replication method propagates changes to the information from the node at which the change originated to all other nodes. Because the size of the changes to the information is often much larger than the size of the command that caused the change, such an implementation may require an undesirably large amount of bandwidth. Another such shortcoming is that, if the information in the master repository were to become corrupted for any reason, that corruption would be propagated to all other replicas of the repository. Because of this, the information repository may not be recoverable or may have to be recovered from an older backup copy, thus entailing further loss of information.

Therefore, a replicated state machine that overcomes drawbacks associated with conventional replicated state machines would be useful and advantageous. More specifically, a replicated information repository built using such a replicated state machine would be superior to a conventional replicated information repository. Even more specifically, a replicated CVS repository built using such a replicated state machine would be superior to a conventional replicated CVS repository.

SUMMARY OF THE DISCLOSURE

Embodiments of the present invention provide for a practical implementation of a replicated state machine in a variety of distributed computing system architectures (e.g., distributed multi-site collaborative computing system architectures). More specifically, embodiments of the present invention enhance scalability, reliability, availability and fault-tolerance of a replicated state machine and/or replicated information repository in a distributed computing system architecture. Accordingly, the present invention advantageously overcomes one or more shortcomings associated with conventional approaches for implementing a replicated state machine and/or a replicated information repository in a distributed computing system architecture.

In one embodiment of the present invention, a replicated state machine comprises a proposal manager, an agreement manager, a collision/back-off timer and a storage reclaimer. The proposal manager facilitates management of proposals issued by a node of a distributed application for enabling coordinated execution of the proposals by all the nodes of the distributed application that need to do so, possibly, but not necessarily including itself. The agreement manager facilitates agreement on the proposals. The collision/back-off timer precludes repeated pre-emptions of rounds in attempting to achieve agreement on the proposals. The storage reclaimer reclaims persistent storage utilized for storing at least one of proposal agreements and the proposals.

In another embodiment of the present invention, a distributed computing system architecture comprises a network system and a plurality of distributed computing systems interconnected via the network system. Each one of the distributed computing systems includes a respective replicated state machine and a respective local application node connected to the respective replicated state machine. The respective replicated state machine of each one of the distributed computing systems facilitates management of proposals for enabling coordinated execution of the proposals by the distributed application node of all other ones of the distributed computing systems, facilitates agreement on the proposals, precludes repeated pre-emptions of rounds in attempting to achieve agreement on the proposals and reclaims persistent storage utilized for storing at least one of proposal agreements and the proposals.

In another embodiment of the present invention, a method comprises a plurality of operations. An operation is performed for facilitating agreement on proposals received from a local application node. An operation is performed for precluding repeated preemptions of rounds in attempting to achieve agreement on the proposals. An operation is performed for reclaiming respective persistent storage utilized for storing at least one of proposal agreements and the proposals.

Turning now to specific aspects of the present invention, in at least one embodiment, at least a portion of the proposals include proposed steps corresponding to implementation of an information update initiated by a node of a distributed application.

In at least one embodiment of the present invention, an issuance order of the proposals is preserved while concurrent agreement on the proposals is facilitated In at least one embodiment of the present invention, a portion of the proposals are proposed write steps corresponding to a respective information update and the proposal manager assigns a local sequence number to each one of the proposed write steps and creates a globally unique interleaving of the proposed write steps such that all nodes of a distributed application executing the proposed write steps execute the proposed write steps in a common sequence.

In at least one embodiment of the present invention, a local sequencer including a plurality of entries each associated with a respective one of the proposals is provided and a global sequencer including a plurality of entries each referencing a respective one of the entries of the local sequencer is provided.

In at least one embodiment of the present invention, each one of the entries of the local sequencer has a unique local sequence number assigned thereto, each one of the entries of the local sequencer is sequentially arranged with respect to the assigned local sequence number and, after the agreement manager facilitates agreement on one of the proposals, an entry corresponding to the one proposal upon which agreement is facilitated is created within the global sequencer in response to determining a position in which the entry is positioned within the global sequencer.

In at least one embodiment of the present invention, the storage reclaimer reclaims persistent storage by deleting a record for the one proposal from persistent proposal storage after the position of the entry in the global sequencer is determined and known to all nodes.

In at least one embodiment of the present invention, the collision/back-off timer precludes repeated pre-emptions by performing an operation of waiting for a computed pre-emption-delay duration to pass after starting a current one of the rounds for a first proposer before initiating a next one of the round for the first proposer and/or an operation of waiting for a computed round-in-progress delay duration to pass after starting a current one of the rounds for the first proposer before starting a next one of the rounds for a second proposer.

These and other objects, embodiments, advantages and/or distinctions of the present invention will become readily apparent upon further review of the following specification, associated drawings and appended claims.

BRIEF DESCRIPTION OF THE DRAWINGS

FIG. 5 is a block diagram showing entry structure of a global sequencer of the replicated state machine of FIG. 3.

FIG. 6 is a block diagram showing entry structure of a local sequencer of the replicated state machine of FIG. 3.

DETAILED DESCRIPTION OF THE DRAWING FIGURES

Disclosed herein, in accordance with the present invention, are various aspects for facilitating a practical implementation of a replicated state machine in a variety of distributed computing system architectures (e.g., distributed multi-site collaborative computing system architecture). A skilled person will be aware of one or more conventional implementations of a replicated state machine. For example, such a conventional implementation of a state machine is disclosed in the publication entitled "Implementing fault-tolerant services using the state machine approach: A tutorial" (pages 299-319), authored by F. B. Schneider, published in ACM Computing Surveys 22 in December of 1990 and is incorporated herein by reference in its entirety. With respect to conventional implementation of a state machine in a distributed application system architecture and as discussed below in greater detail, embodiments of the present invention enhance aspects of scalability, reliability, availability and fault-tolerance.

Figure 1:
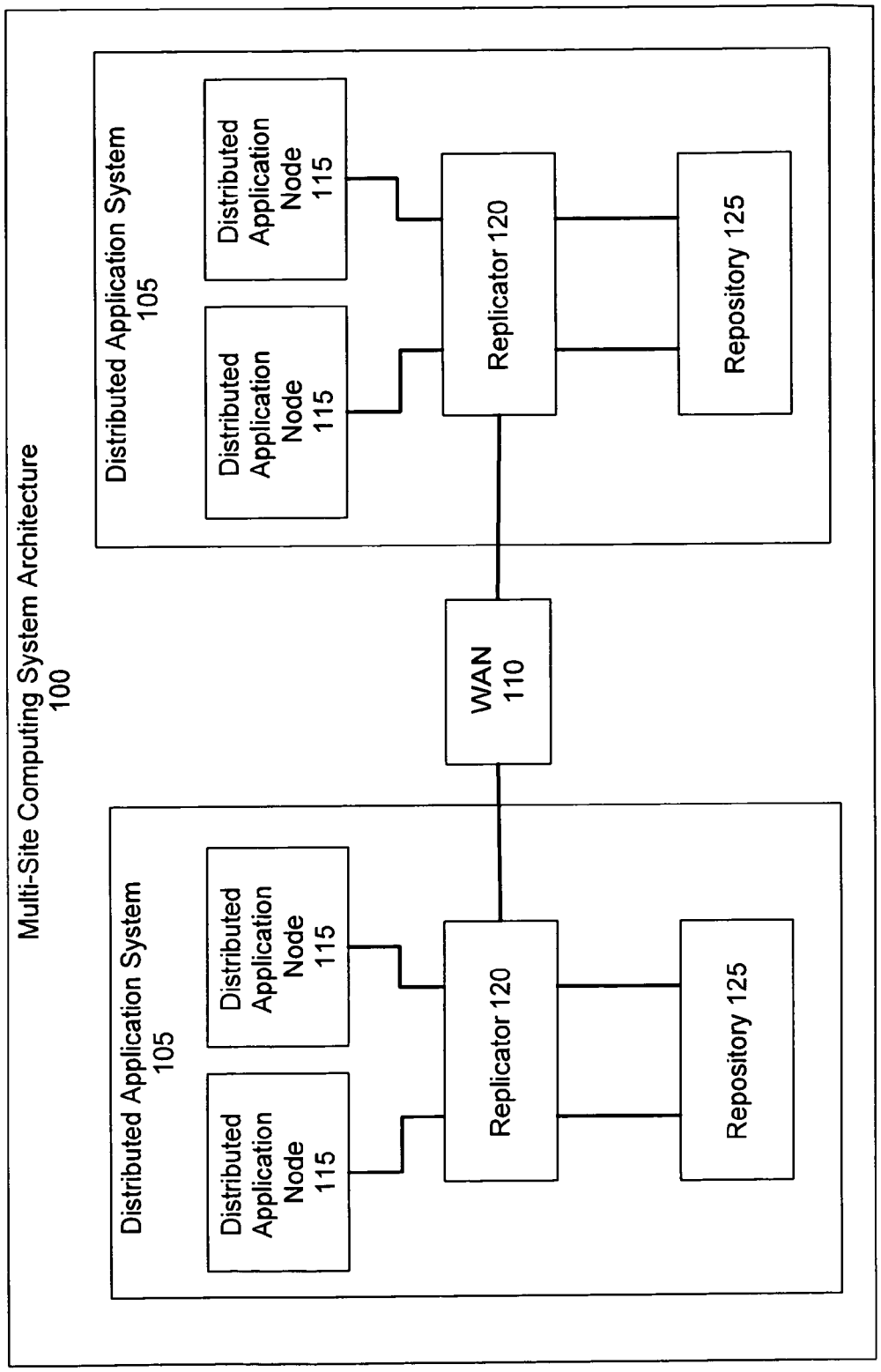
FIG. 1 is a block diagram showing functional relationships of elements within a multi-site computing system architecture in accordance with the present invention.

As shown in FIG. 1, a multi-site computing system architecture in accordance with the present invention (i.e., referred to herein as the multi-site computing system architecture 100) includes a plurality of distributed application systems 105 interconnected by a Wide Area Network (WAN) 110. Each one of the distributed application systems 105 includes a plurality of distributed application nodes 115 (e.g., an application running on a workstation), a replicator 120 and a repository replica 125. The replicator 120 of each distributed application system 105 is connected between the WAN 110, the distributed application nodes 115 of the respective distributed application system 105 and the repository replica 125 of the respective distributed application system 105.

In one embodiment of the present invention, each repository replica 125 is a Concurrent Versions System (CVS) repository. CVS is a known open source code versioning system. CVS, like most other source code versioning systems, is designed to run as a central server to which multiple CVS clients (e.g., a distributed application nodes 115) connect using a CVS protocol over, for example, Transmission Control Protocol (TCP). The CVS server, as implemented, forks a process per client connection to handle a CVS request from each client. Accordingly, the replicator 120 and the repository replica 125 allows for multiple replicas of a CVS repository. While a CVS information repository is one example of an information repository useful with the present invention, the present invention is useful in replicating other types of information repositories. Databases and file systems are examples of other such types of information repositories. Accordingly, usefulness and applicability of the present invention is not limited to a particular type of information repository.

As is discussed below in greater detail, each replicator 120 is configured for writing information updates from its respective distributed application system 105 to the repository replica 125 of each other distributed application system 105. Each replicator 120 is the intermediary that acts as an application gateway between CVS clients (i.e., a respective distributed application node 115) and a given CVS server (i.e., the respective repository replica 125). Each replicator 120 coordinates with other peer replicators to ensure that all of the repository replicas 125 stay in sync with each other.

Unlike conventional solutions, the multi-site computing system architecture 100 does not rely on a central transaction coordinator that is known to be a single-point-of-failure. The multi-site computing system architecture 100 provides a unique approach to real-time active-active replication, operating on the principle of one-copy equivalence across all CVS repository replicas of a distributed application system. Accordingly, in accordance with the present invention, every repository replica is in sync with every other repository replica in a real-time manner, so users at every node of the distributed application system (i.e., distributed application node) are always working from the same information base (e.g., programmers working from the same code base).

Through integration of the replicator 120 with the respective repository replica 125, each repository replica becomes an active node on the WAN 110 with its own transaction coordinator (i.e., the respective replicator 120). Each distributed transaction coordinator accepts local updates and propagate them to all of the other repository replicas 125 in real-time. Accordingly, all users within the multi-site computing system architecture 100 are effectively working from the same repository information (e.g., a single CVS information repository) regardless of location. To this end, a multi-site computing system architecture in accordance with the present invention is a cost-effective, fault-tolerant software configuration management (SCM) solution that synchronizes work from globally distributed development teams in real-time.

When network or server failures occur, developers can continue working. Changes are logged in a transaction journal of the local one of the replicators 120. The transaction journal is similar in function to a database redo log. When connectivity is restored, the local one of the replicators 120 reaches out to the replicator 120 of other ones of the distributed application systems 105 to bring the local one of the repository replicas 125 up to date, as well as apply the changes captured in the local transaction journal while the network or system was down. Recovery is implemented automatically, without any intervention from a CVS administrator. This self-healing capability ensures zero loss of data, no lost development time, and eliminates the risk of human error in a disaster recovery scenario.

The benefits of working from essentially the same repository information include not having to change development procedures when development moves abroad, not having to sit idle while waiting for large builds to complete when work from multiple sites is being integrated, being able to detect development problems earlier and spending less resources (e.g., reducing redundant resource utilization) in Quality Assurance. In addition, disaster recovery isn't an issue because the integrated self-healing capability provides disaster avoidance. Work is never lost when a system goes down.

As disclosed above, implementation of a replicated state machine in accordance with the present invention advantageously impacts scalability, reliability, availability and fault-tolerance of such a replicated state machine. By advantageously impacting scalability, reliability, availability and fault-tolerance, the present provides a practical approach to implementing a replicated state machine in a multi-site computing system architecture. In implementing a replicated state machine in accordance with the present invention, all or a portion of the following objects will be met: allowing nodes of a distributed computing system of computers to evolve their state in a coordinated manner; allowing the consistency of a distributed system of computers to be preserved despite arbitrary failures or partial failures of the computer networks, computers or computing resources; allowing a reliable system of distributed application nodes to be created out of components with modest reliability; ensuring the termination of the agreement protocol with probability as a function of time asymptotically approaching 1, despite collisions in the agreement protocol; eliminating collisions in the agreement protocol under normal operating conditions; improving the efficiency of the agreement protocol; reducing and bounding the memory and disk usage of the replicated state machine; reducing the usage of network resources by the replicated state machine; increasing the throughput of state transitions realizable by the replicated state machine; and enabling more efficient management of memory and disk resources by the distributed application nodes served by the replicated state machine.

Figure 2:
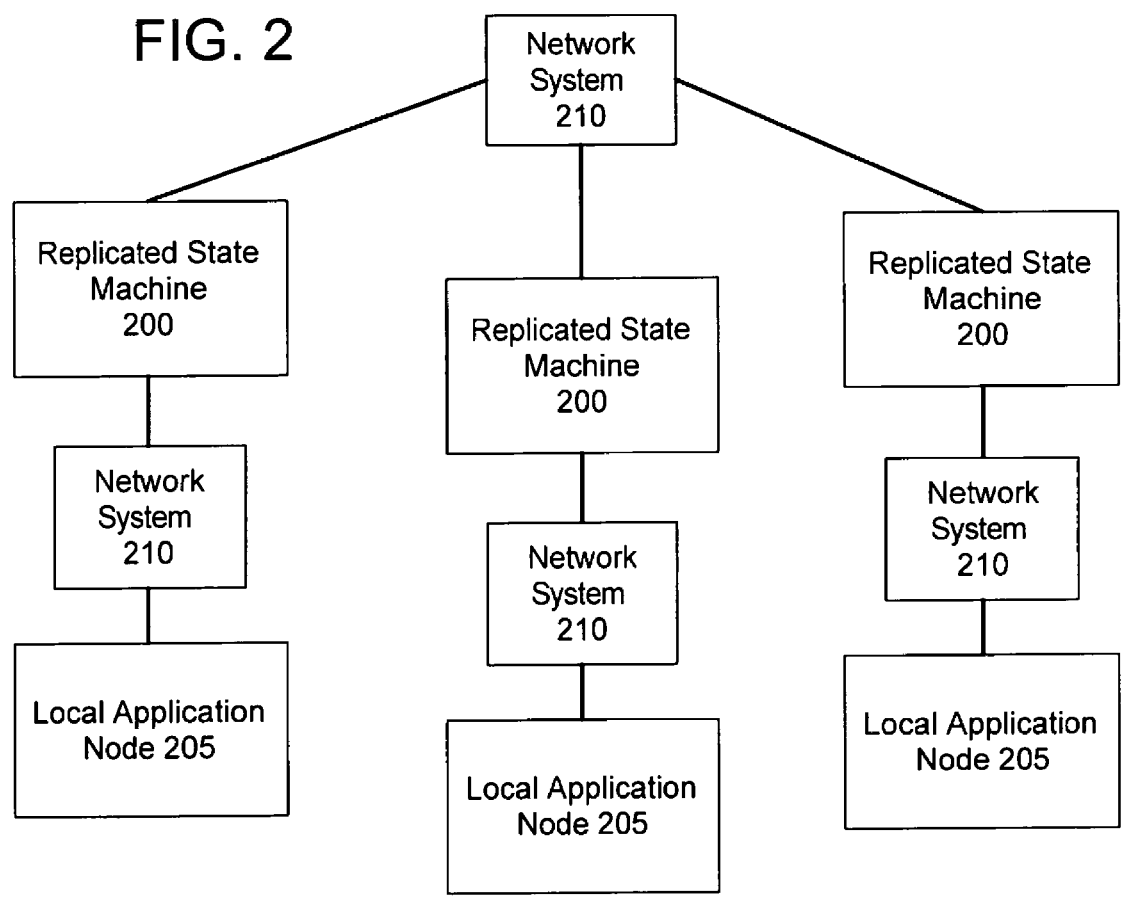
FIG. 2 is a high-level block diagram showing deployment of elements making up a multi-site computing system architecture in accordance with the present invention.

As shown in FIG. 2, multi-site computing functionality in accordance with the present invention is facilitated by a plurality of replicated state machines 200 that interact with each other and with a respective local application node 205 through a network system 210. Preferably, but not necessarily, each local application node 205 is that of a distributed application and serves as a proposal proposer or proposal acceptor at any given point in time. In one embodiment, the network system 210 includes a Wide Area Network (WAN) connected between the replicated state machines 200 and a respective Local Area Network (LAN) connected between each replicated state machine 200 and the respective local application node 205. For example, each replicated state machine 200 and its respective local application node 205 are situated at a respective site for a multi-site collaborative computing project. The LAN-portion of the network system 210 facilitates sharing of information on a local basis (i.e., between each replicated state machine 200 and its respective local application node 205) and the WAN-portion of the network system 210 facilitates sharing of information on a global basis (i.e., between the replicated state machines 200). While a LAN, a WAN or both are examples of constituent components of a network system in accordance with the present invention, the present invention is not limited to a particular configuration of network system. For example, other embodiments of a network system in accordance with the present invention include an ad-hoc network system including embedded computers in an automobile, a network system comprising a plurality of subnets in a data center and a network system including a subnet within a data center.

Figure 3:
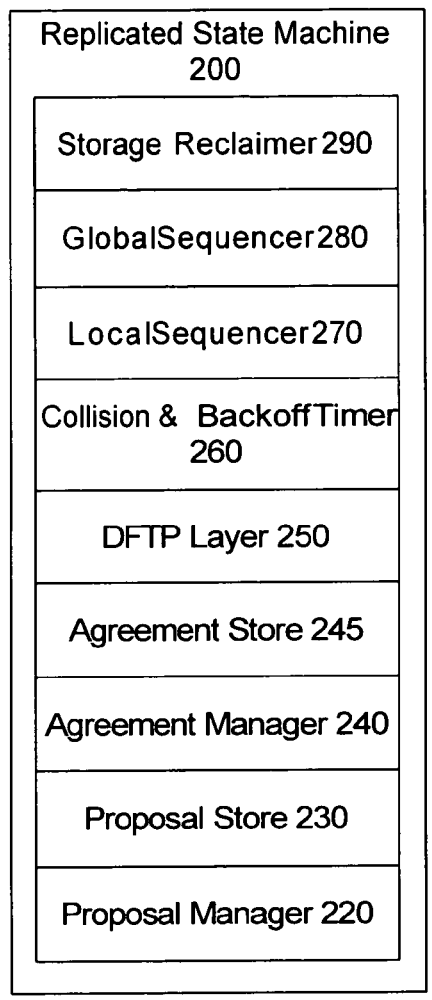
FIG. 3 is a block diagram showing functional components of a replicated state machine in accordance with the present invention.

FIG. 3 is a block diagram showing functional components of each replicated state machine 200 shown in FIG. 2. Each replicated state machine 200 includes a proposal manager 220, persistence proposal storage 230, an agreement manager 240, an agreement store, 245, a Distributed File Transfer Protocol (DFTP) layer 250, a collision & back-off timer 260, a local sequencer 270, a global sequencer 280 and a storage reclaimer 290 (i.e., a persistent storage garbage collector). The proposal manager 220, persistence proposal storage 230, the agreement manager 240, the agreement store, 245, the DFTP layer 250, the collision & back-off timer 260, the local sequencer 270, the global sequencer 280 and the storage reclaimer 290 are interconnected to at least a portion of each other for enabling interaction therebetween. As will be seen in the following discussion, each of the replicated state machine functional components supports advantageous functionality in accordance with the present invention.

Proposal Management

Each local application node 205 proposes a sequence of proposals to the respective replicated state machine 200. The sequence of proposals proposed by each local node 6 constitutes a local sequence of that respective local node 205, which is maintained within the local sequencer 270 of the respective replicated state machine 200. The proposal manager 220 of each replicated state machine 200 organizes the respective sequence of proposals into a single respective global sequence of proposals, which is maintained within the global sequencer 280 of the respective replicated state machine 200. Each global sequence of proposals has the following properties: each proposal of each local sequence occurs exactly once in the respective global sequence, the relative ordering of any two proposals in a local sequence is optionally preserved in the respective global sequence, and the global sequences (with or without local ordering preserved) associated with all of the local application nodes 205 are identical.

When a thread of the local application node 205 proposes a proposal (e.g., write steps) to the respective replicated state machine 200, the replicated state machine 200 assigns a local sequence number to the proposal. That replicated state machine 200 then determines an agreement number for that proposal. As will become apparent from the discussions below, the agreement number determines the position of a respective proposal in the global sequence. The replicated state machine 200 then saves a record of the proposal in its persistent proposal storage 230. The replicated state machine 200 then returns control of the local application node's thread back to the local application node, so the thread is available for use by the local application, and not idle while the agreement protocol executes. The replicate state machine then initiates an agreement protocol for the proposal 110 via the agreement manager 245. When the agreement protocol terminates, the replicated state machine 200 compares the agreement reached by the agreement protocol with proposed agreement contained within the proposal. If the agreement reached by the agreement manager 245 is the same as that of the proposal, the replicated state machine 200 concludes processing of the proposal. Otherwise, the replicated state machine 200 repeatedly attempts agreement on the proposal 110 using a new agreement number until the agreement reached by the agreement manager is the same as that of the proposal. Upon the conclusion of an agreement, each local application node 205 enqueues the now agreed upon proposal in its global sequence. Thereafter, each local application node 205 of the distributed application dequeues and executes the proposals contained within the global sequence.

Figure 4:
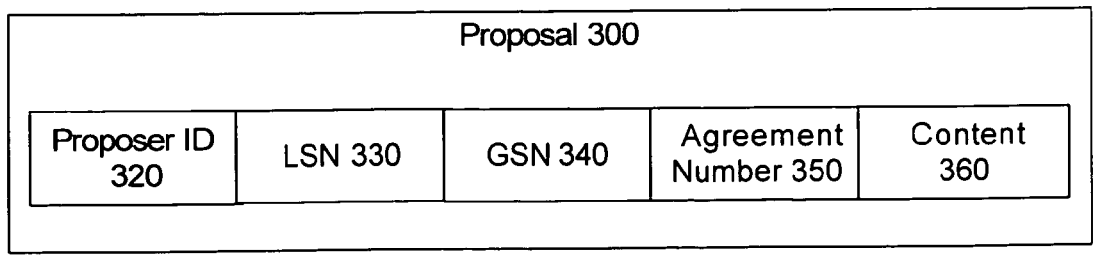
FIG. 4 is a block diagram showing a proposal issued by a local application node in accordance with the present invention.

FIG. 4 shows an embodiment of a proposal in accordance with present invention, which is referred to herein as the proposal 300. The proposal 300 includes a proposer identifier 320 (i.e., an identifier of a local application node), a local sequence number (LSN) 330, a global sequence number (GSN) 340, an agreement number 350 and proposal content 360. Preferably, but not necessarily, the proposals issued by each local application node 205 have the structure of the proposal 300.

FIG. 5 shows an embodiment of a local sequence in accordance with the present invention, which is referred to herein as the local sequence 400. The local sequence 400 includes the contents of each one of the proposals for the respective local application node 205. More specifically, such contents include the proposer identifier, the local sequence number (LSN), the global sequence number (GSN), the agreement number and the proposal content. Preferably, but not necessarily, the local sequence associated with each replicated state machine 200 have the structure of the local sequence 400.

FIG. 6 shows an embodiment of a global sequence in accordance with the present invention, which is referred to herein as the global sequence 500. The global sequence includes the global sequence number for a series of proposals and a local sequence handle. In one embodiment of the present invention, the local sequence handle is a pointer to the respective local sequence (i.e., as depicted, the local sequence 400). In another embodiment, the local sequence handle is a key to a table of local sequences. Preferably, but not necessarily, the global sequence associated with each replicated state machine 200 have the structure of the global sequence 500.

Concurrent Agreements

The replicated state machines 200 depicted in FIGS. 2 and 3, which are replicated state machines in accordance with the present invention, incorporate a concurrent agreement mechanism that allows agreement on multiple proposals from a proposer to progress concurrently while, optionally, preserving the order in which the proposer submitted the proposals. In contrast, conventional replicated state machines attempt agreement on a proposal after reaching agreement on a previous proposal. This conventional replicated state machine methodology ensures that a conventional replicated state machine preserves the local order of proposals. Thus, if a proposer first proposes proposal A and then proposes proposal B, the conventional replicated state machine ensures that proposal A is agreed upon and before proposal B. However, unlike a replicated state machine implementing a back-off mechanism in accordance with the present invention, this convention methodology slows down the operation of the conventional replicated state machine as agreement on proposal B is not initiated until proposal A has reached agreement.

Referring now to aspects of the present invention, each object (i.e., an entry) in the global sequence is sequentially numbered. The number associated with an object in the global sequence identifies its position relative to the other objects in the global sequence. For example, an object numbered 5 precedes an object numbered 6 and is preceded by an object numbered 4. Furthermore, each object in the global sequence contains a handle to a local sequence, such as the local sequence handle 400 shown in FIG. 5. If the application does not require preservation of the submission order (i.e., order as issued from source), each object in the global sequence contains the proposal itself. In this case, the proposal is obtained directly from the global sequence rather than indirectly via the local sequence. In one of several possible embodiments of the present invention, the handle to the local sequence is a pointer to the local sequence. In another embodiment of the present invention, the handle to the local sequence is a key to a table of local sequences.

Referring now to FIGS. 2 and 3, each local sequence contains the proposals of the replicated state machine 200 proposed by one of the proposers of the replicated state machine 200. Each local application node 205 of the replicated state machine 200 maintains a local sequence for each of the proposers associated with the replicated state machine 200. The objects in the local sequence are sequentially numbered. The number associated with an object in the local sequence identifies its position relative to the other objects in the local sequence. For example, the object numbered 5 precedes the object numbered 6 and is preceded by the object numbered 4. Each object in the local sequence contains a proposal of the replicated state machine 200.

At each local application node 205 of the replicated state machine 200, after agreement has been reached on a proposal, the proposal is added to the global sequence. The identity of the proposer (e.g., proposer ID 320 in FIG. 4) is used as the key to look up a local sequence from the table of local sequences. The local sequence number (LSN) of the proposal determines the position of the proposal in the local sequence. The proposal is then inserted in the determined position in the local sequence. The agreement number of the proposal (e.g., agreement number 350 in FIG. 4) determines the position of the proposal in the global sequence. A handle to the local sequence is inserted in the determined position in the global sequence (i.e., based on the agreement number). The GSN is an optional bookkeeping field to associate with the proposal for designating the proposal's actual position in the global sequence when it is consumed as described in the paragraph below.

In one embodiment of our invention, a dedicated thread consumes the global sequence. The thread waits until the next position in the global sequence is populated. The thread then extracts the local sequence stored in that position of the global sequence. The thread then waits until the next position in the local sequence is populated. The thread then extracts the proposal of the replicated state machine 200 stored in that position of the local sequence. A skilled person will appreciate that the proposals will not necessarily be extracted according to the sequence of agreement numbers, but will be extracted in exactly the same sequence at all the application nodes. This extraction sequence may be recorded for bookkeeping convenience in the GSN field, but is otherwise not essential to the operation of the replicated state machine 200. For example, assume that an application node (A) submits its first two proposals to the replicated state machine (LSN 1 and LSN 2). Assume further that the replicated state machine happened to reach agreement on LSN 2 before reaching agreement on LSN 1. Hence, the agreement number for A:1 (LSN 1 from application node A) is 27 and the agreement number for LSN 2 is 26 (i.e., there were a total of 25 preceding agreements on proposals from other application nodes and no intervening agreements on proposals from other application nodes between A:1 and A:2). Using the above method, A:1 will be extracted from the global sequence in position 26, and A:2 in position 27. Thus, the GSN will respect LSN order, but the agreement number does necessarily not need to do so. This methodology enables a replicated state machine in accordance with the present invention to process agreements concurrently.

The thread then applies the proposal of the replicated state machine 200. In a preferred embodiment of the present invention, application of the proposal is accomplished by invoking a call-back function registered by an application of the replicated state machine 200.

Back-Off & Collision Avoidance

A replicated state machine in accordance with the present invention (e.g., the replicated state machine 200) includes a back-off mechanism for avoiding repeated pre-emption of proposers (e.g., local application nodes 205) in the agreement protocol of the agreement manager 240. In contrast, when a round initiated by a first proposer pre-empts a round initiated by a second proposer, a conventional replicated state machines allows the pre-empted proposer to immediately initiate a new round with a round number higher than that of the pre-emptor. Undesirably, this conventional methodology sets the stage for repeated pre-emptions of rounds, which can lead an agreement protocol to thrash for a unacceptably long time (e.g., perpetually).

In facilitating back-off in accordance with the present invention, when a round is pre-empted, the proposer computes the duration of a pre-emption-delay. The proposer then waits for that computed duration before initiating the next round in accordance with a conventional algorithm for initiating such a next round.

In facilitating collision avoidance in accordance with the present invention, when a first proposer senses that a second proposer has initiated a round, the first proposer computes the duration of a round-in-progress-delay. The first proposer refrains from initiating a round until the duration of the computed delay has expired.

In a preferred embodiment of the present invention, a given delay grows exponentially with subsequent pre-emptions of a round. In addition, the delay is preferably randomized.

There are several possible methods that can be used to determine the duration of a given delay. One source of inspiration for viable methods is the literature on Carrier Sense Multiple Access/Collision Detection (CSMA/CD) protocols for non-switched Ethernet. A CSMA/CD protocol is a set of rules determining how network devices respond when two network devices attempt to use a data channel simultaneously.

In one of several possible embodiments of the present invention, the following method determines the duration of a calculated delay. An administrator deploying the replicated state machine 200 configures four numerical values. For the purpose of the description of this embodiment, the values are called A, U, R and X. In a valid configuration, the Value R is greater than zero, and less than one; the value A is greater than zero; the value X is greater than one; the value U is greater than the value A. The execution time of the agreement protocol is estimated. One of several possible estimators of the execution time of the agreement protocol is a moving-window average of past execution times of the agreement protocol. For the purpose of this discussion, this estimated value will is called E. A is multiplied by U to determine the value M. The greater of the two values A and E is selected. For the purpose of this discussion, this selected value is called F. F is multiplied by X to determine the value C. A random value V is generated from a uniform distribution between zero and C times R. If C is greater than M, V is subtracted from C to compute D. Otherwise, V is added to C to compute D.

The computed value D is used as the round-in-progress-delay. It is also used as the pre-emption delay the first time a local application node 205 is pre-empted in the execution of an agreement protocol instance. Each subsequent time the local application node 205 is pre-empted in the execution of the agreement protocol instance, a new value D is computed using the old value D in place of the value A in the above method. The new value D is used as the pre-emption delay.

Reclaiming Persistent Storage

A replicated state machine in accordance with the present invention (e.g., the replicated state machine 200) reclaims persistent storage used to ensure its fault tolerance and high availability. Referring to FIGS. 2 and 3, the storage reclaimer 290 deletes a record of a proposed proposal from the proposal store 230 after the replicated state machine 200 has determined the position of the proposed proposal in the global sequence and all application nodes are informed of this position. At periodic intervals, each local application node 205 sends a message to each other local nodes 205 indicating the highest contiguously populated position in its copy of the global sequence. At periodic intervals, the storage reclaimer 290 deletes all agreements up to the highest contiguously populated position in all copies of the global sequence that are no longer required by the local application node. In this manner, each replicated state machine 200 reclaims persistent storage.

Weak Reservations

A replicated state machine in accordance with the present invention (e.g., the replicated state machine 200) provides an optional weak reservation mechanism to eliminate pre-emption of proposers under normal operating conditions. Referring to FIGS. 2 and 3, each proposer driving a respective replicated state machine 200 is contiguously numbered. For example, if there are three proposers, they may be numbered 1, 2, and 3. A proposer's number determines which proposals of the respective replicated state machine 200 that a corresponding proposer will drive. If a proposer's number is M, and if there are N proposers, the proposer will drive proposals numbered M+(k×N) (i.e., M plus k multiplied by N, for all integer values of k greater than or equal to 0). To allow a distributed application system to make progress when all of the proposers of such system are not available, if a proposal of the replicated state machine 200 is not determined in a timely manner, any proposer associated with the respective replicated state machine 200 may propose a "no operation" (i.e., no-op) for that proposal. To make this optimization transparent to the distributed application, the replicated state machine 200 does not deliver the no-op proposals to the distributed application. No operation refers to a computation step that, in general, does not have any effect, and in particular, does not change the state of the associated replicated state machine.

Distinguished and Fair Round Numbers

A replicated state machine in accordance with the present invention ensures that one of a plurality of competing proposers will not be pre-empted when using the same round number for competing proposals. In contrast, conventional replicated state machines do not include a mechanism that ensures that one of a plurality of competing proposers will not be preempted when using the same round number for competing proposals. A round number in such conventional replicated state machines is a monotonic value, which makes it possible for all of the proposers to be pre-empted.

With regard to the present invention, in addition to the monotonic component, the round number contains a distinguished component. In a preferred embodiment of the present invention, a small distinct integer is associated with each proposer of each replicated state machine 200. The distinct integer serves to resolve conflicts in favor of the proposer with the highest distinguished component. In addition to the monotonic component and the distinguished component, the round number contains a random component. A round number of this fashion ensures that one of a plurality of competing proposers will not be pre-empted when using the same round number for competing proposals (i.e., via the distinct component of the round number) and ensures that the conflict resolution does not perpetually favor or disfavor any particular one of the proposers (i.e., via the random component of the round number).

A mechanism to compare two round numbers operates as follows. The round number with the larger monotonic component is larger than the other. If the monotonic components of the two round numbers are equal, the round number with the larger random component is larger than the other. If the two comparisons above do not distinguish the round numbers, the round number with the larger distinguished component is larger than the other. If the three comparisons above do not distinguish the round numbers, the round numbers are equal.

Reclaiming Persistent Storage Efficiently

Referring to FIGS. 3 and 4, the records in the persistent proposal store 230 of a replicated state machine 200 are organized into groups. Each group stores records of proposed proposals with contiguous local sequence numbers 330. For example, records with local sequence numbers #1 through #10000 may belong in group-1, records with local sequence numbers #10001 through #20000 may belong in group-2, and so on.

Referring to groups of persistent proposals, each group is stored is such a way that the storage resources used by the entire group can be efficiently reclaimed. For example, in a file-based storage system, each group uses its own file or set of files.

Still referring to groups of persistent proposals, the storage reclaimer 290 tracks requests to delete individual records, but does not delete individual records at the time of the requests. When the accumulated requests to delete individual records include all the records in a group, the storage reclaimer 290 efficiently reclaims the storage resources used by the group. For example, in a file-based storage system, the file or set of files used by the group is deleted.

The records in the agreement store 245 of the replicated state machine 200 are organized into groups. Each group stores records of agreement protocol instances with contiguous agreement instance numbers 150. For example, records with agreement instance numbers #1 through #10000 may belong in group-1, records with agreement instance numbers #10001 through #20000 may belong in group-2, and so on.

Referring to groups of agreement protocol instances, each group is stored is such a way that the storage resources used by the entire group can be efficiently reclaimed. For example, in a file-based storage system, each group uses its own file or set of files.

Still referring to groups of agreement protocol instances, the storage reclaimer 290 tracks requests to delete individual records, but does not delete individual records at the time of the requests. When the accumulated requests to delete individual records include all the records in a group, the storage reclaimer 290 efficiently reclaims the storage resources used by the group. For example, in a file-based storage system, the file or set of files used by the group is deleted.

Handling Small Proposals Efficiently

Referring to FIGS. 3 and 4, a replicated state machine in accordance with the present invention (e.g., the replicated state machine 200) batches the transmission of the proposed proposals to the replicated state machine 200 from an originating one of the local application nodes 205 to recipient ones of the local application nodes 205. Such a practice allows a replicated state machine in accordance with the present invention to efficiently utilize a packet-based communication protocol in a situation where the size of proposals of the replicated state machine are small relative to the size of a packet of data in the underlying packet-based communication protocol used by the replicated state machine.

In a preferred embodiment of the present invention, such a batch of proposals is treated as a single proposal by the agreement protocol. In this manner, at each local node 205, while a respective replicated state machine 200 is determining the agreement number 350 of a first batch of proposed proposals, the proposals proposed at the respective local application node 205 is accumulated in a second batch of proposals. When the agreement number 150 of the first batch is determined, the replicated state machine 200 initiates the determination of the agreement instance number 350 of the second batch, and the proposals proposed at that local application node 205 are accumulated in a third batch—and so on.

Handling Large Proposals 110 Efficiently

To reduce network bandwidth for large proposals, a replicated state machine in accordance with the present invention allows proposals to be tagged by a short proposal id (e.g., a 16 bytes globally unique id) and/or proposals can be encoded into a format referred to as file based proposal. In contrast, large proposals present a problem to conventional replicated state machines in that such large proposals are essentially sent multiple time over a network as driven by the agreement protocol of a conventional replicated state machine. Such multiple transmission is not preferred because the size of large proposals can be several megabytes or even gigabytes.

With respect to the present invention, when transmitting large proposals, only short proposal identifiers are transmitted once the actual proposal has been transmitted successfully to a network end-point. File-based proposals essentially carry an in-memory file pointer while the actual proposal content is kept on disk in a file. When transporting such a file-based proposal on the network, a replicated state machine in accordance with the present invention uses an efficient fault-tolerant file streaming protocol. Such transporting is handled by the DFTP layer 250 of a replicated state machine 200 (FIG. 3). The DFTP layer 250 tracks the pair-file based proposal and a network end-point. It ensures a file-based proposal is only transmitted once to a network end-point. In the event of failures leading to partial transfers, the file-based proposal can be retrieved from any available end-point that has the required portion of the file.

In a preferred embodiment, implementation of DFTP uses native sendfile or memory-mapped files for efficient file transfer if the operating system supports these features. If the original sender is not reachable by a node that requires a file, that node will locate an alternate sender—a different node in the system which happens to have the file. When operating over the TCP protocol, DFTP uses multiple TCP connections to take best advantage of high bandwidth connections that are also subject to high latency. In addition, to take best advantage of high bandwidth connections that are also subject to high latency, a window size of the TCP protocol can be appropriately and/or desirably tuned.

Turning now to a discussion of scalable and active replication of information repositories, in one embodiment, implementation of such replication in accordance with the present invention utilizes the abovementioned replicated state machine. More specifically, providing for such replication in accordance with the present invention advantageously impacts scalability, reliability, availability and fault-tolerance of such a replicated state machine. Accordingly, implementation of a replicated state machine in accordance with the present invention advantageously impacts such replication in a distributed computing system architecture. In implementing replication of an information repository in accordance with the present invention, all or a portion of the following objects will be met: enabling replicating a CVS repository, a database, or any information repository in general; allowing concurrent use, including modification, of all the replicas of an information repository; preserving the consistency of the replicas despite essentially arbitrary failures or partial failures of the computer networks used in the replication infrastructure; preserving the consistency of the replicas despite essentially arbitrary failures or partial failures of the computers or computing resources associated with the replicas; ensuring the continuous availability of the information repository despite significant failures of the nature described above; allowing geographic distribution of replicas such that there are no constraints on how far apart (e.g., on different continents) or how close (e.g., in the same data center, or even in the same rack) the replicas are to each other; allowing all the replicas of the information repository in conjunction to handle a higher load than can be handled by one instance of the repository; preserving one-copy-equivalence of the replicas; enabling the replication of the information repository without introducing a single point of failure in the system; allowing the replication of an information repository without modifications to the implementations of the information repository; allowing the replication of an information repository without modifications to the implementations of the clients of the information repository; offering clients of a CVS repository response times of a collocated local CVS repository via rotating quorum of replica; reducing the network communication between clients of CVS repository and remote CVS repository by a factor of about 3 on a wide area network (e.g., about 4.5 round trips to about 1.5 round trips); allowing remote recovery of failed replicas in an automated fashion without requiring administrator's intervention; and ensuring distributed state cleanup of all replicas in an automated fashion without requiring administrator's intervention.

Figure 7:
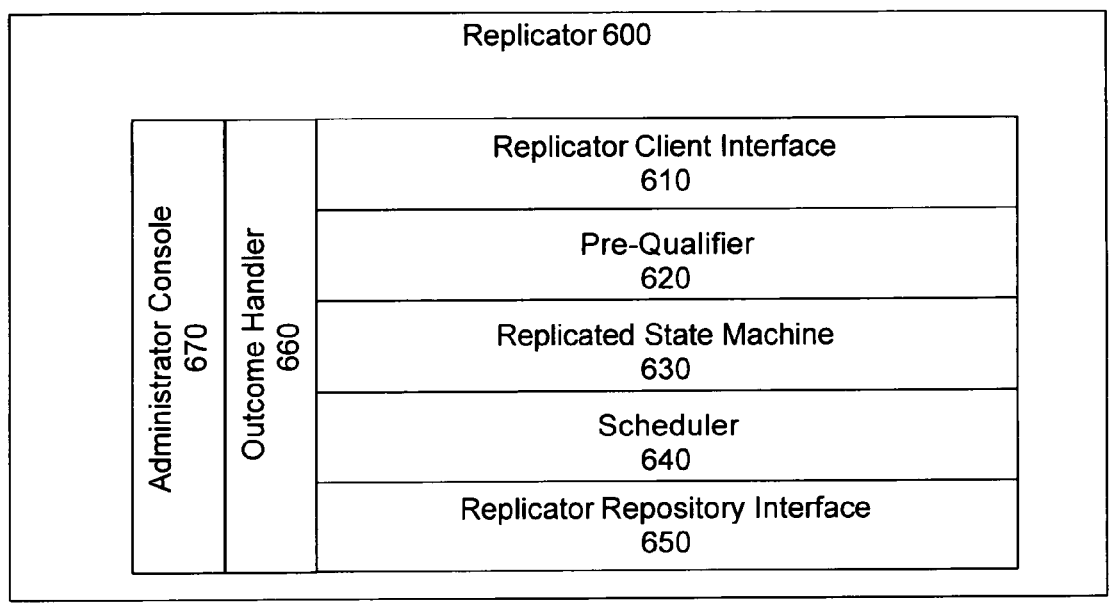
FIG. 7. is a block diagram showing a replicator in accordance with the present invention.

Referring to FIG. 7, a preferred embodiment of a replicator in accordance with the present invention is shown, which is referred to herein as the replicator 600. The replicator 600 consists of a plurality of functional modules, including a replicator client interface 610, a pre-qualifier 620, a replicated state machine 630, a scheduler 640, a replicator repository interface 650, an outcome handler 660 and an administrator console 670. The replicator client interface 610, the pre-qualifier 620, the replicated state machine 630, the scheduler 640, the replicator repository interface 650, the outcome handler 660 and the administrator console 670 are each interconnected to at least a portion of the other modules for enabling interaction therebetween. The replicated state machine 200, whose functionality was discussed in reference to FIGS. 2-6, is an example of the replicated state machine 630 of the replicator 600. Thus, the replicated state machine 630 is reliable, available, scalable and fault tolerant.

Figure 8:
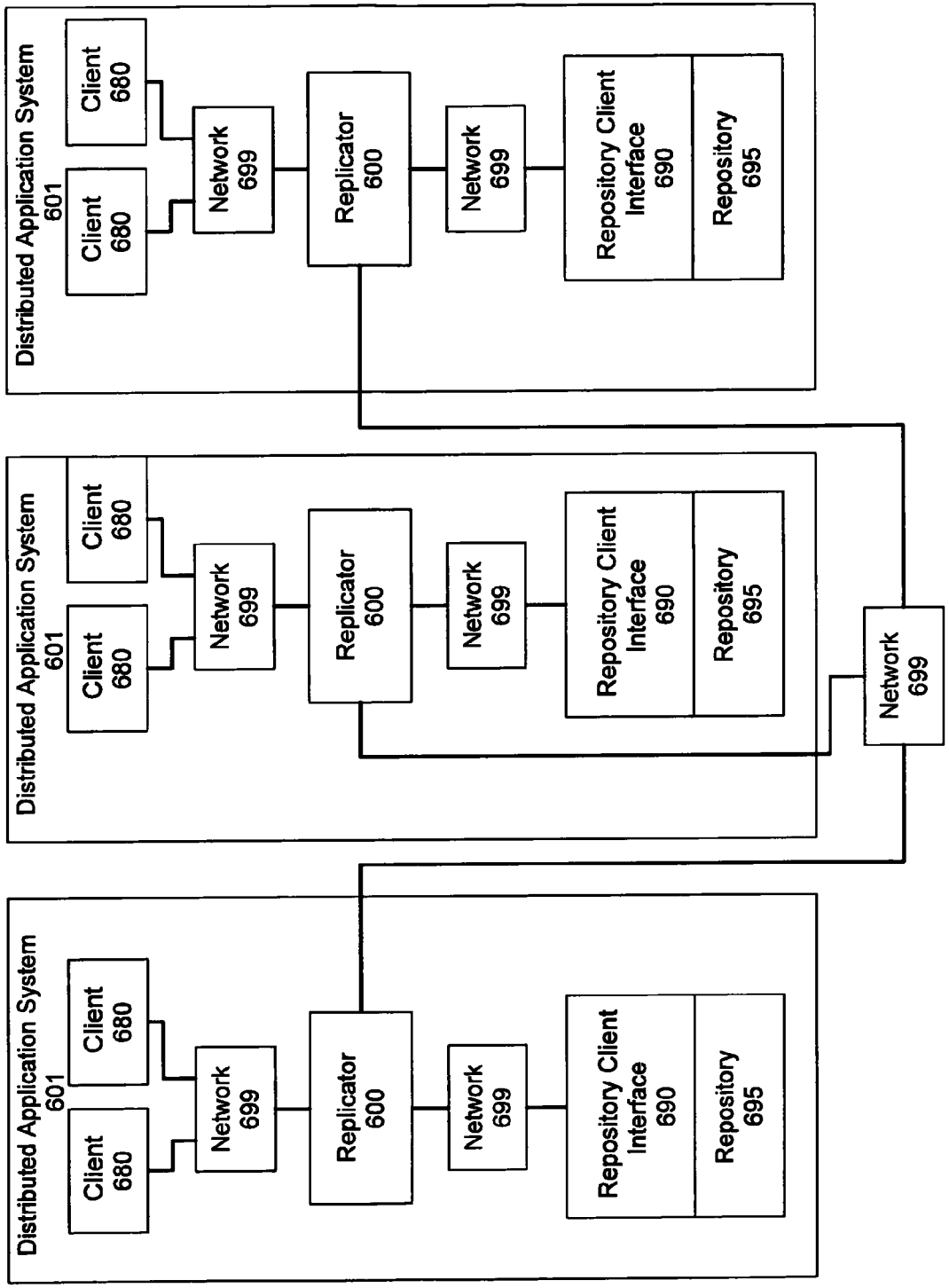
FIG. 8 is a detailed-level block diagram showing deployment of elements making up a multi-site computing system architecture in accordance with the present invention.

FIG. 8 shows an embodiment of deployment of the replicator 600 within a multi-site computing system architecture in accordance with the present invention. The multi-site computing system architecture includes a plurality of distributed application systems 601. Each distributed application system 601 includes a plurality of clients 680, a replicator 600, a repository client interface 690, a repository 695 (i.e., an information repository) and a network 699. The network 699, which is generally not necessarily a component of any one plurality of distributed application systems 601, is connected between the clients 680 of each distributed application system 601 and the respective replicator 600 and between the repository client interface 690 of each distributed application system 601 and the respective replicator 600, thus interconnecting the clients 680, replicator 600 and repository 695 of each distributed application system 601 for enabling interaction such components of each distributed application system 601. The network 600 is also connected between the replicator 600 of all of the distributed application system 601, thus enabling interaction between all of the distributed application system 601. The networks 699 can be isolated from each other, but they do not need to be. For example, the same network can fulfill all three of the above disclosed roles.

As shown in FIG. 8, three clients 680 are "near" each one of the repositories 695 (i.e., a system element of the distributed application systems 601 comprising a respective repository 695). By near, it is meant that a particular one of the clients 680 near a particular one of the repositories 695 would prefer to access that particular one of the repositories 695. Alternatively, that particular one of the clients 680 could potentially access the repository 695 of any one of the distributed application systems 601.

The operators of a distributed computing system in accordance with the present invention include the users of the client 680 and the administrator or administrators of the distributed application systems 601. The users of the client 680 follow the instructions of their client user's manual. A user could remain oblivious to the fact that they are using a replicator in accordance with the present invention, as many of the advantageous aspects of the present invention are transparent to the user. An administrator, in addition to the standard tasks of administering the repository 695 itself, will configure the networks accordingly, as needed and if needed for the operation with the present invention.

The replicated state machines 630 of each distributed application system 601 communicate with each other over the network 699. Each replicator repository interface 650 interacts through the network 695 with the repository 695 of the respective distributed application system 601. The client 680 interacts through the network 699 with the replicator client interface 610. Optionally, a product such as, for example, Cisco Systems Director may be used to enable a particular client 680 of a particular one of the distributed application systems 601 to fail over to any of the other distributed application systems 601, if the distributed application system 601 comprising the client 680 is not available at a particular time for providing a required functionality.

Referring now to FIGS. 7 and 8, the replicator client interface 610 is responsible for interfacing with a particular one of the clients 680 (i.e., the particular client 680) associated with a targeted repository 695. The replicator client interface 610 reconstructs the commands issued by the particular client 680 over the network 699 and delivers the commands to the pre-qualifier 620. The pre-qualifier 620 enables efficient operation of the replicator 600, but is not required for the useful and advantageous operation of the replicator 600.

For each command, the pre-qualifier 620 may optionally determine whether the command is doomed to fail, and if so, determine an appropriate error message or error status to be returned to the particular client 680. If so, that error message or error status is returned to the replicator client interface 610 and the replicator client interface 610 delivers that error message or error status to the particular client 680. Thereafter, the command is not processed any further by the replicator 600.

For each command, the pre-qualifier 620 may optionally determine whether the command can bypass the replicated state machine 630 or both the replicated state machine 630 and the scheduler 640. If the pre-qualifier 620 did not determine that the replicated state machine 630 could be bypassed, the command is delivered to the replicated state machine 630. The replicated state machine 630 collates all of the commands submitted to it and its peer replicated state machines 630 at each other associated replicator 600 of the distributed application system 601. This sequence of operations is assured to be identical at all the distributed application systems 601. At each of the distributed application systems 601, the respective replicated state machine 630 delivers the commands collated as above, in sequence, to the respective scheduler 640.

The Scheduler 640 performs a dependency analysis on the commands delivered to it, and determines the weakest partial ordering of commands that would still ensure one-copy serializability. Such dependency analysis and one-copy serializability are disclosed in the prior art reference of Wesley Addison entitled "Concurrent Control & Recovery in Database Systems" and published in a reference book by P. Berstein et. al. The scheduler 640 then delivers the commands to the replicator repository interface 650, concurrently when permitted by the constructed partial order, sequentially otherwise.

The replicator repository interface 650 delivers the commands to the repository 695. In response, one of three outcomes ensues. Thereafter, the replicator repository interface 650 delivers the ensuing outcome to the outcome handler 660. In a first one of the A first one of the outcomes includes the repository 695 returning a response to the command. This response contains a result, a status or both, indicating that nothing went wrong during the execution of the command. If the command originated locally, the outcome handler 660 delivers the response to the replicator client interface 610, which in turn delivers the response to the client 680. If the command originated at a replicator of a different distributed application system 601, the response is preferably discarded.

A second one of the outcomes includes the repository 695 responds with an error status. The outcome handler 660 determines whether the error status indicates a deterministic error in the repository 695 (i.e., whether the same or comparable error would occur at each of the other distributed application systems 601). If the determination of the error is ambiguous, the outcome handler 660 attempts to compare the error with the outcome at other distributed application systems 601. If this does not resolve the ambiguity, or if the error is unambiguously non-deterministic, the outcome handler 660 will suspend the operation of the replicator 600 and inform the operator via the administrator console 670 (i.e., via issuance of a notification via the administrative console 670).

In the case where the replicator is a CVS replicator, as is discussed below in reference to CVS-specific functionality, a list of error patterns is used by the outcome handler to flag deterministic error. The outcome handler 660 uses these patterns to do a regular expression match in the response stream.

A third one of the outcomes includes the repository 695 hanging (i.e., does not return from the execution of the command). In a preferred embodiment of the present invention, this outcome is treated exactly like a non-deterministic error as discussed in reference to the second one of the outcomes.

In accordance with the present invention, each replicator 600 can be alternatively configured. In one alternative embodiment, the replicator 600 is embedded in and driven directly by the client 680 of the repository 695. In another alternative embodiment, the replicator 600 is embedded in the client interface 690 to the repository 695. In another alternative embodiment, the replicator 600 is embedded in the repository 695. In another alternative embodiment, the global sequencer of the replicator (e.g., the global sequencer 280 shown in the replicated state machine 200 in FIG. 3) is based on other technologies, with corresponding compromises of robustness and quality of service. One of several possible examples of such a technology is Group Communication. In another alternative embodiment, the replicator 600 drives more than one repository 695, with corresponding compromise of robustness and quality of service. In another alternative embodiment, the modules of the replicator 600 are merged into more coarse-grained modules, split into more fine-grained modules, or both. In another alternative embodiment, as a redundant safeguard against deviation from one-copy-serializability, responses of all the distributed application systems 601 are compared to ensure that the information contained in the repositories 695 of each distributed application system 601 remains consistent with respect to each other distributed application system 601.

In reference to FIGS. 7 and 8, each one of the repositories 695 discussed above may be a Concurrent Versions System (CVS) repository and the clients 680 may correspondingly be CVS clients. Where the repositories 695 are CVS repositories and the clients 680 are CVS clients, the interfaces associated with the repositories 695 and the clients 680 are CVS specific interfaces (e.g., a replicator CVS client interface, a replicator CVS repository interface and a repository CVS client interface). Furthermore, in accordance with the present invention, the replicator 600 can be modified to include functionality that is specifically and especially configured for use with a CVS repository.

The replicator client interface 610 disclosed herein may be configured specifically for interfacing with a CVS client of a targeted CVS repository. To this end, the replicator client interface 610 stores incoming bytes from the CVS Client into a memory mapped file buffer. The replicator client interface 610 detects the end of CVS command when it sees a valid command string in the incoming byte stream. A preferred, but not limiting, list of such valid command strings includes, but is not limited to, "Root", "Valid-responses", "valid-requests", "Repository", "Directory", "Max-dotdot", "Static-directory", "Sticky", "Entry", "Kopt", "Checkin-time", "Modified", "Is-modified", "UseUnchanged", "Unchanged", "Notify", "Questionable", "Argument", "Argumentx", "Global_option", "Gzip-stream", "wrapper-sendme-rcsOptions", "Set", "expand-modules", "ci", "co", "update", "diff", "log", "rlog", "list", "rlist", "global-list-quiet", "ls", "add", "remove", "update-patches", "gzip-file-contents", "status", "rdiff", "tag", "rtag", "import", "admin", "export", "history", "release", "watch-on", "watch-off", "watch-add", "watch-remove", "watchers", "editors", "init", "annotate", "rannotate", "noop" and "version".

The replicator client interface 610 then tries to classify the incoming CVS command as a read command or a write command. A preferred, but not limiting, list of valid write command strings includes, but is not limited to, "ci", "tag", "rtag", "admin", "import", "add", "remove", "watch-on", "watch-off" and "init". Any command within the preferred list of valid command strings that does not belong to the preferred list of valid write command strings is deemed herein to be a read command string with respect to the preferred list of valid command strings.

The read commands are directly delivered to the CVS replicator repository interface for execution by the targeted CVS repository. The CVS write commands are optionally delivered to the Pre-qualifier module 20.

For each CVS write command, the Pre-qualifier module 20 may optionally determine whether the CVS command is doomed to fail, and if so, determine an appropriate error message or error status to be returned to the CVS client. The failure detection is based on matching the result or status byte stream returned by the CVS repository with known error patterns. Examples of known system error patterns included, but are not limited to, cannot create symbolic link from .* to .*; cannot start server via rsh; cannot fstat .*; failed to create temporary file; cannot open dbm file .* for creation; cannot write to .*; can't stat history file; cannot open history file: .*; cannot open '.*'; could not stat RCS archive .* for mapping; cannot open file .* for comparing; virtual memory exhausted; cannot ftello in RCS file .*; can't read .*; unable to get list of auxiliary groups; cannot fsync file .* after copying; cannot stat .*; cannot open current directory; cannot stat directory .*; cannot write .*; cannot readlink .*; cannot close pipe; cannot change to directory .*; cannot create temporary file; could not get file information for .*; could not open diff output file .*; cannot create .*; cannot get working directory; cannot lstat .*; fork for diff failed on .*; could not get info for '.*'; cannot change mode for .*; cannot ftello for .*; Message verification failed; cannot stat temp file .*; out of memory; cannot make directory .* in .*; login: Failed to read password; error reading history file; could not get working directory; can't set close-on-exec flag on \d+; error writing to lock file .*; cannot write to history file: .*; cannot rename file .* to .*; cannot change to .* directory; cannot get file information for .*; cannot create .* for copying; cannot write temporary file .*; cannot open .*; flow control read failed; writing to server; cannot close .*; could not open lock file '.*' cannot fdopen \d+ for read; cannot close temporary file .*; not change directory to requested checkout directory '.*'; cannot make directory.*; invalid umask value in; failed to open .* for reading; unable to get number of auxiliary groups; could not open .* for writing; could not chdir to .*; fork failed while diffing .*; could not open .*; cannot fdopen \d+ for write; write to .* failed; cannot create temporary file .*; could not read .*; cannot write file .* for copying; cannot open .* for copying; cannot dup2 pipe; cannot getwd in .*; cannot open .* for writing; cannot fork; error writing to server; could not check in .* —fork failed; cannot read file .* for comparing; cannot link .* to .*; error closing .*; cannot dup net connection; read of data failed; cannot read .*; cannot remove .*; could not chdir to '.*'; unable to open temp file .*; could not stat .*; cannot open directory .*; fwrite failed; cannot create temporary file '.*'; cannot stat temp file; can't stat .*; cannot read '.*'; error diffing .*; could not create special file .*; cannot close history file: .*; could not map memory to RCS archive *; cannot make directory '.*'; cannot read file .* for copying; cannot create pipe; cannot open temporary file .*; cannot remove file .*; cannot open; cannot seek to end of history file: .*; cannot chdir to .*; read of length failed; cannot exec .*; cannot fdopen .* and cannot find size of temp file. Examples of known non-system error patterns included, but are not limited to, internal error; no such repository; could not find desired version; getsockname failed:; warning: ferror set while rewriting RCS file; internal error: islink doesn't like readlink; access denied; cannot compare device files on this system; server internal error: unhandled case in server_updated; received .* signal; internal error: no revision information for; protocol error: duplicate Mode; server internal error: no mode in server_updated; rcsbuf cache open: internal error; Fatal error, aborting; fatal error: exiting; .*: unexpected EOF; .*: confused revision number; invalid rcs file; EOF in key in RCS file; RCS files in CVS always end in,v; lost hardlink info for; cannot read .*: end of file; rcsbuf open: internal error; out of memory; cannot allocate infopath; dying gasps from .* unexpected; internal error: bad date .*; kerberos authentication failed: .*;.*, delta .*: unexpected EOF; unexpected EOF reading RCS file .*; ERROR: out of space-aborting; flow control EOF; cannot fseeko RCS file .*; checksum failure on .*; CVS internal error: unknown status \d+; internal error: bad argument to run_print; cannot copy device files on this system; unexpected end of file reading .*; out of memory; internal error: no parsed RCS file; internal error: EOF too early in RCS_copydeltas; internal error: testing support for unknown response\?; EOF in value in RCS file .*; PANIC\* administration files missing\!; premature end of file reading .*; EOF while looking for value in RCS file .*; cannot continue; read lock failed-giving up; unexpected EOF reading .*; cannot resurrect '.*'; RCS file removed by second party; your apparent username .* is unknown to this system; file attribute database corruption: tab missing in .*; can't import .*: unable to import device files on this system; can't import .*: unknown kind of special file; cannot import .*: special file of unknown type; ERROR: cannot mkdir .* —not added; cannot create write lock in repository '.*'; cannot create .*: unable to create special files on this system; can't preserve .*: unable to save device files on this system; error parsing repository file .* file may be corrupt and unknown file status \d+ for file .*.

As discussed above in reference to FIGS. 7 and 8, for each command, the pre-qualifier module 620 may determine that the command is doomed to fail and can bypass both the replicated state machine 630 and the scheduler 640. In the case of CVS specific functionality, if the pre-qualifier module 620 did not determine that the replicated state machine 630 could be bypassed, the command is converted into a CVS proposal command. The CVS proposal command contains the actual CVS command byte array as well as a lock set describing the write locks this CVS command would cause the CVS repository to obtain if it was executed by it directly. As is discussed below, the scheduler 640 utilizes this lock set.

The CVS proposal command is delivered to the replicated state machine 630. The replicated state machine 630 collates all the commands submitted to it and its peer replicated state machines 630 at each of the other replicators, into a sequence. This sequence is assured to be identical at all the replicas. At each of the distributed application systems 601, the replicated state machine 630 delivers the commands collated as above, in sequence, to the scheduler 640.

The scheduler 640 performs a dependency analysis on the commands delivered to it, and determines the weakest partial ordering of commands that would still ensure one-copy serializability. The scheduler 640 delivers the commands to the CVS replicator repository interface, concurrently when permitted by the constructed partial order, sequentially otherwise.

In accordance with the present invention, the dependency analysis is based on testing for lock conflicts. Each CVS proposal command submitted to the scheduler contains a lock set. The scheduler ensures a command is delivered to the CVS repository interface if and only if no other command's lock set conflicts with its lock set. If a conflict is detected the command waits in queue to be scheduled at a latter point when all the locks in the lock set can be obtained without conflicts.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A Computer-readable storage device containing a set of instructions that causes a computer to generate a replicated state machine, comprising:
    a proposal manager configured to store, in persistent storage, a local sequence of proposals issued by a node of a distributed application and to store, in the persistent storage, a global sequence of proposals that is maintained identical across all other nodes of the distributed application, the proposal manager further being configured to enable concurrent updates of the global sequence of proposals by all nodes of the distributed application;
    an agreement manager that configured to manage agreement on the proposals, wherein the proposal manager and the agreement manager are configured to enable peer-to-peer interaction between all nodes of the distributed application to enable each node of the distributed application to serve as a proposal proposer and proposal acceptor at any given point in time;
    a collision/back-off tinier configured to preclude repeated preemptions of rounds in attempting to achieve agreement on the proposals; and
    a storage reclaimer configured to reclaim the persistent storage utilized for storing at least one of proposal agreements and of the proposals.

2. The computer-readable storage device of claim 1, wherein at least a portion of the proposals include proposed steps corresponding to implementation of an information update initiated by the node of the distributed application.

3. The computer-readable storage device of claim 1, wherein an issuance order of the proposals is preserved while concurrent agreement on the proposals is facilitated.

4. The computer-readable storage device of claim 1, wherein:
    a portion of the proposals includes proposed write steps corresponding to a respective information update; and
    the proposal manager is configured to assign a local sequence number to each one of the proposed write steps and to create the global sequence of proposals that includes the proposed write steps such that all nodes of the distributed application executing the proposed write steps execute the proposed write steps in a common sequence.

5. The computer-readable storage device of claim 1, wherein the replicated state machine further comprises:
    a local sequencer configured to maintain the stored local sequence of proposals, the local sequence of proposals including a plurality of entries each associated with a respective one of the proposals; and
    a global sequencer configured to maintain the stored global sequence of proposals, the global sequence of proposals including a plurality of entries each referencing a respective one of the entries of the local sequencer;
    wherein each one of the entries of the local sequence of proposals includes a unique local sequence number assigned thereto;
    wherein each one of the entries of the local sequence of proposals is sequentially arranged with respect to the assigned local sequence number; and
    wherein, after the agreement manager facilitates agreement on one of the proposals, an entry corresponding to the one proposal upon which agreement is created within the global sequence of proposals in response to determining a position in which the entry is to be positioned within the global sequence of proposals.

6. The computer-readable storage device of claim 5, wherein the collision/back-off timer is configured to preclude repeated preemptions by performing at least one of waiting for a computed preemption-delay duration to pass after starting a current one of the rounds for a first proposer before initiating a next one of the round for the first proposer and waiting for a computed round-in-progress delay duration to pass after starting a current one of the rounds for the first proposer before starting a next one of the rounds for a second proposer.

7. The computer-readable storage device of claim 1, wherein the storage reclaimer is configured to reclaim the persistent storage by deleting an entry in the local sequence of proposals after determining a position of the entry in the global sequence of proposals.

8. The computer-readable storage device of claim 1, wherein the collision/back-off timer is configured to preclude repeated preemptions by performing at least one of waiting for a computed preemption-delay duration to pass after starting a current one of the rounds for a first proposer before initiating a next one of the round for the first proposer and waiting for a computed round-in-progress delay duration to pass after starting as current one of the rounds for the first proposer before starting a next one of the rounds for a second proposer.

9. The computer-readable storage device of claim 1, wherein each node in the distributed system includes a replicated state machine.

10. The computer-readable storage device of claim 1, wherein each node in the distributed application is configured to act as a proposal manager with respect to proposals issued by the node.

11. The computer-readable storage device of claim 10, wherein each node in the distributed application is configured to issue proposals.

12. The computer-readable storage device of claim 1, wherein each node in the distributed application is configured as a peer of every other node.

13. The computer-readable storage device of claim 1, wherein the agreement manager is configured to operate in a peer-to-peer manner to facilitate agreement on the proposals.

14. The computer-readable storage device of claim 1, wherein the collision/back-off timer is configured to preclude repeated preemptions of rounds in attempting to achieve agreement on the proposals in a peer-to-peer manner.

15. The computer-readable storage device of claim 1, wherein the storage reclaimer is configured to reclaim persistent storage utilized for storing at least one of proposal agreements and the proposals in a peer-to-peer manner.

16. The computer-readable storage device of claim 1, wherein the coordinated execution of the proposals produces replicated state machines in accordance with the principle of one-copy equivalence.

17. The computer-readable storage device of claim 1, wherein the replicated state machine is replicated over a plurality of data repositories, and wherein the coordinated execution of the proposals causes every data repository replica to be in sync with every other repository replica in a real-time manner.

18. A multi-site computing system, comprising:
a plurality of distributed computing systems coupled to one another via a network system;
wherein each one of the distributed computing systems includes a respective replicated state machine and a respective local application node coupled to the respective replicated state machine;
wherein the respective replicated state machine of each one of the distributed computing systems is configured to:
manage proposals to enable concurrent updating and coordinated execution of the proposals by the distributed application node of all other ones of the distributed computing systems through peer-to-peer interactions between respective replicated state machines, manage agreement on the proposals such that the management of proposals and the management of agreements comprise enabling each replicated state machine to serve as a proposal proposer and proposal acceptor at any given point in time, preclude repeated preemptions of rounds in attempting to achieve agreement on the proposals, and reclaim persistent storage utilized for storing at least one of proposal agreements and the proposals.

19. The multi-site computing system of claim 18, wherein:
a portion of the proposals includes proposed write steps corresponding to a respective information update; and
the respective replicated state machine coupled to the respective distributed application node that issued the proposed write steps is configured to assign a local sequence number to each one of the proposed write steps and to create a global sequence of proposals that includes a globally unique interleaving of the proposed write steps such that the distributed application nodes of the other ones of the distributed application systems executing the proposed write steps execute the proposed write steps in a common sequence.

20. The multi-site computing system of claim 18, wherein:
each one of the replicated state machines includes a local sequence of proposals that includes a plurality of entries each associated with a respective one of the proposals and a global sequence of proposals including a plurality of entries each referencing a respective one of the entries of the local sequence of proposals;
each one of the entries of the local sequence of proposals includes a unique local sequence number assigned thereto;
each one of the entries of the local sequence of proposals is sequentially arranged with respect to the assigned local sequence number; and
after agreement on one of the proposals is facilitated, an entry corresponding to the one proposal upon which agreement is facilitated in the global sequence of proposals in response to determining a position in which the entry is positioned within the global sequence of proposals.

21. The multi-site computing system of claim 20, wherein the replicated state machine is configured to reclaim the respective persistent storage by deleting a record for the one proposal from persistent proposal storage after the position of the entry in the global sequence of proposals is determined.

22. The multi-site computing system of claim 20, wherein the replicated state machine precludes repeated preemptions by performing at least one of waiting for a computed preemption-delay duration to pass after starting a current one of the rounds for a first proposer before initiating a next one of the round for the first proposer and waiting for a computed round-in-progress delay duration to pass after starting a current one of the rounds for the first proposer before starting a next one of the rounds for a second proposer.

23. The multi-site computing system of claim 18, wherein the replicated state machine precludes repeated preemptions by performing at least one of waiting for a computed preemption-delay duration to pass after starting a current one of the rounds for a first proposer before initiating a next one of the round for the first proposer and waiting for a computed round-in-progress delay duration to pass after starting a current one of the rounds for the first proposer before starting a next one of the rounds for a second proposer.

24. The multi-site computing system of claim 18, wherein each replicated state machine of each one of the distributed computing system includes a proposal manager that is configured to manage proposals so as to enable the coordinated execution of the proposals by the distributed application node of all other ones of the distributed computing systems.

25. The multi-site computing system of claim 18, wherein the proposal manager is further configured to mange a process of obtaining agreement on the proposals, and to preclude repeated preemptions of rounds in attempting to achieve agreement on the proposals.

26. The multi-site computing system of claim 18, wherein the respective replicated state machine of each one of the distributed computing systems is configured to manage proposals in a peer-to-peer manner.

27. The multi-site computing system of claim 18, wherein the coordinated execution of the proposals produces a replicated state machine in accordance with the principle of one-copy equivalence.

28. The multi-site computing system of claim 18, wherein the replicated state machine is replicated over a plurality of data repositories, and wherein the coordinated execution of the proposals causes every data repository replica to be in sync with every other repository replica in a real-tune manner.

29. A network, comprising:
a plurality of distributed computing systems, each distributed computing system including a replicated state machine having a local application node coupled thereto, and wherein each replicated state machine is a peer to each other replicated state machine and is configured to (a) manage proposals and maintain a local sequence of proposals issued by the local application node coupled thereto, provide a global sequence of proposals that is maintained identical across all other ones of the plurality of distributed computing systems and to enable coordinated execution of the proposals by the distributed application node of all other ones of the distributed computing systems, (b) manage agreement on the proposals, (c) preclude repeated preemptions of rounds in attempting to achieve agreement on the proposals, d) interact peer-to-peer with each other to enable concurrent updates of the global sequence of proposals by the plurality of distributed computing systems, such that the management of proposals and the management of agreements comprise enabling each replicated state machine to serve as a proposal proposer and proposal acceptor at any given point in time.

30. The network of claim 29, wherein each replicated state machine is further configured to reclaim persistent storage utilized for storing at least one of proposal agreements and the proposals.

31. The network of claim 29, wherein:
a portion of the proposals includes proposed write steps corresponding to a respective information update; and
each replicated state machine coupled to the respective distributed application node that issued the proposed write steps is configured to assign a local sequence number to each one the proposed write steps and to create the global sequence of proposals such that the distributed application nodes of the other ones of the distributed application systems executing the proposed write steps execute the proposed write steps in a common sequence.

32. The network of claim 31, wherein the replicated state machine is further configured to reclaim the respective persistent storage by deleting a record for the one proposal from persistent proposal storage after a position of the entry in the global sequence of proposals is determined.

33. The network of claim 31, wherein the replicated state machine is configured to preclude repeated preemptions by performing at least one of waiting for a computed preemption-delay duration to pass after starting a current one of the rounds for a first proposer before initiating a next one of the round for the first proposer and waiting for a computed round-in-progress delay duration to pass after starting a current one of the rounds for the first proposer before starting a next one of the rounds for a second proposer.

34. The network of claim 29, wherein:
each replicated state machines includes a local sequencer configured to maintain the local sequence of proposals and a global sequencer configured to maintain the global sequence of proposals that includes a plurality of entries each referencing a respective one of the entries of the local sequence of proposals;
each one of the entries of the local sequence of proposals includes a unique local sequence number assigned thereto;
each one of the entries of the local sequence of proposals is sequentially arranged with respect to the assigned local sequence number; and
after agreement on one of the proposals is reached, an entry corresponding to the one proposal upon which agreement is reached is made in the global sequence of proposals, after determining a position thereof in the global sequence of proposals.

35. The network of claim 29, wherein the replicated state machine is configured to preclude repeated preemptions by performing at least one of waiting for a computed preemption-delay duration to pass after starting a current one of the rounds for a first proposer before initiating a next one of the round for the first proposer and waiting for a computed round-in-progress delay duration to pass after starting a current one of the rounds for the first proposer before starting a next one of the rounds for a second proposer.

36. The network of claim 29, wherein each replicated state machine is configured to manage coordinated execution, by all nodes that are not local to the replicated state machine, of proposals originating with the local application node.

37. A system, comprising:
a plurality of nodes, the plurality of nodes including at least:
a first node including a first computer and having a first replicated state machine associated therewith, the first replicated state machine being coupled to a network and being configured to maintain a first local sequence of proposals, the first local sequence of proposals including proposals originating from the first node;
a second node including a second computer, the second node being coupled to the network, the second node having a second replicated state machine associated therewith, the second replicated state machine being configured to maintain a second local sequence of proposals, the second local sequence of proposals including proposals originating from the second node, each of the first and second replicated state machines being peers of one another and being configured to store a global sequence of proposals that is maintained identical in the first and second replicated state machines;
wherein the first and second state machines are configured to interact peer-to-peer with each other to enable concurrent updates of the global sequence of proposals over the network by enabling each of the first and second state machines to propose proposals to and accept proposals from the other at any given point in time;
wherein the first state machine is configured to manage proposed changes originating from the first node; and
wherein the second state machine is configured to manage proposed changes originating from the second node.

38. The system of claim 37, wherein each replicated state machine is configured to preclude repeated preemptions of rounds in attempting to achieve agreement on the proposals.

39. The system of claim 37, wherein at least a portion of the first and second state machines is stored in first, and second respective tangible media.

40. The system of claim 37, wherein the first and second state machines have one-copy equivalence.

41. The system of claim 37, wherein the first and second replicated state machines are maintained iii sync in a real-time manner.

* * * * *

UNITED STATES PATENT AND TRADEMARK OFFICE
CERTIFICATE OF CORRECTION

PATENT NO. : 8,364,633 B2
APPLICATION NO. : 11/329996
DATED : January 29, 2013
INVENTOR(S) : Yeturu Aahlad et al.

It is certified that error appears in the above-identified patent and that said Letters Patent is hereby corrected as shown below:

Column 21, line 54, Claim 1, should read: -- an agreement manager configured to manage agree- --

Column 21, line 60, Claim 1, should read: -- a collison/back-off timer configured to preclude repeated --

Column 24, line 51, Claim 25, should read: -- the proposal manager is further configured to manage a pro- --

Column 24, line 67, Claim 28, should read: -- sync with every other repository replica in a real-time manner. --

Column 26, line 60, Claim 41, should read: -- replicated state machines are maintained in sync in a real- --

Signed and Sealed this
Twenty-sixth Day of February, 2013

Teresa Stanek Rea
*Acting Director of the United States Patent and Trademark Office*